C. E. CLEVELAND.
BAND SAW RESAWING MACHINE.
APPLICATION FILED DEC. 19, 1906.

941,758.

Patented Nov. 30, 1909.

Fig. 2.

UNITED STATES PATENT OFFICE.

CHARLES E. CLEVELAND, OF FOND DU LAC, WISCONSIN.

BAND-SAW RESAWING-MACHINE.

941,758.

Specification of Letters Patent.

Patented Nov. 30, 1909.

Application filed December 19, 1906. Serial No. 348,651.

*To all whom it may concern:*

Be it known that I, CHARLES E. CLEVELAND, a citizen of the United States, residing at Fond du Lac, in the county of Fond du Lac and State of Wisconsin, have invented certain new and useful Improvements in Band-Saw Resawing-Machines, of which the following is a specification.

The present invention pertains to improvements in band-saw resawing machines, the construction and advantages of which will be hereinafter set forth, reference being had to the annexed drawings, wherein.

The main object of the invention is to provide a superior feeding mechanism in which the roll axles or shafts are supported at both top and bottom.

A further object of the invention is to provide means whereby the rolls may be adjusted with reference to the saw and to each other, as desired, the means employed being such that one set of rolls may be held in a fixed relation to the saw while the remaining set is held up to the lumber with a yielding pressure. Again, both sets of rolls may be held up against the stock with a yielding pressure, the distance of each set of rolls from the saw-line being varied as desired.

Another object is to provide means for arresting the rotation of the rolls and at the same time separating the opposite roll-pairs to permit withdrawal of the stock.

A still further object of the invention is to provide the initial or intake roll of one of the roll-pairs with a yielding bearing whereby the stock may be more readily entered, especially if the stock is rough.

With these and other objects in view, the advantages of which will hereinafter appear, a detail description will now be given.

A denotes the frame or bed of the mill; B the column supporting the upper band-wheel shaft; C the upper wheel; D the lower wheel, and E the saw.

A suitable straining mechanism will be employed, that shown being of an improved type and specifically reserved for a separate application.

The bed A has secured to or formed therewith a forwardly-extending bed or table F, which forms the support for the roll driving and adjusting mechanisms.

Bolted to the column B and extending outwardly therefrom at one side of the wheel C is a bracket or casting G, which forms the guide and housing for the slides in which the upper ends of the roll shafts or axles have their bearing.

Figure 1:
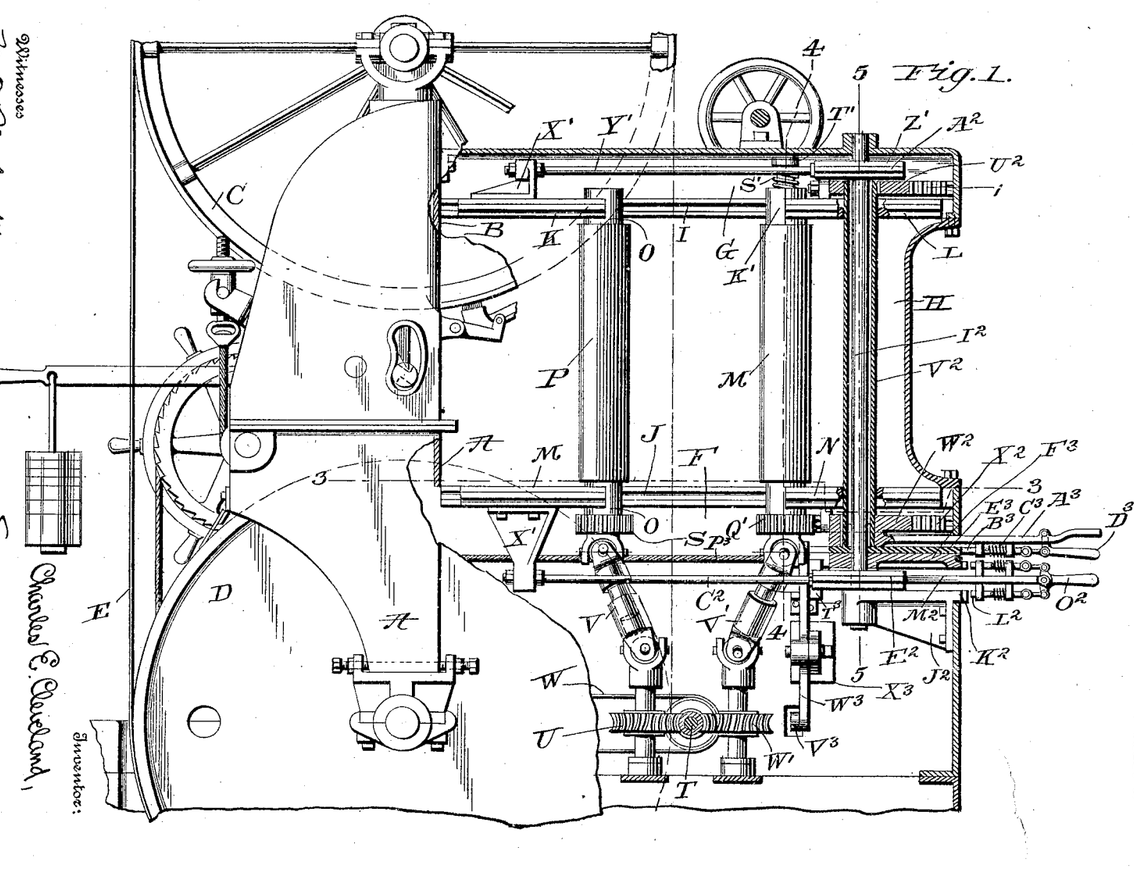
Figure 1 is a sectional elevation of the machine.

A column H, Fig. 1, secured to the outer end of the bed or table F and likewise secured to the outer end of the bracket, forms a support for the latter and rigidly holds the same in place. Guideways or channels I are formed in the opposite faces of the bracket, see Fig. 5, and similar guideways J are provided in the table F.

Figure 3:
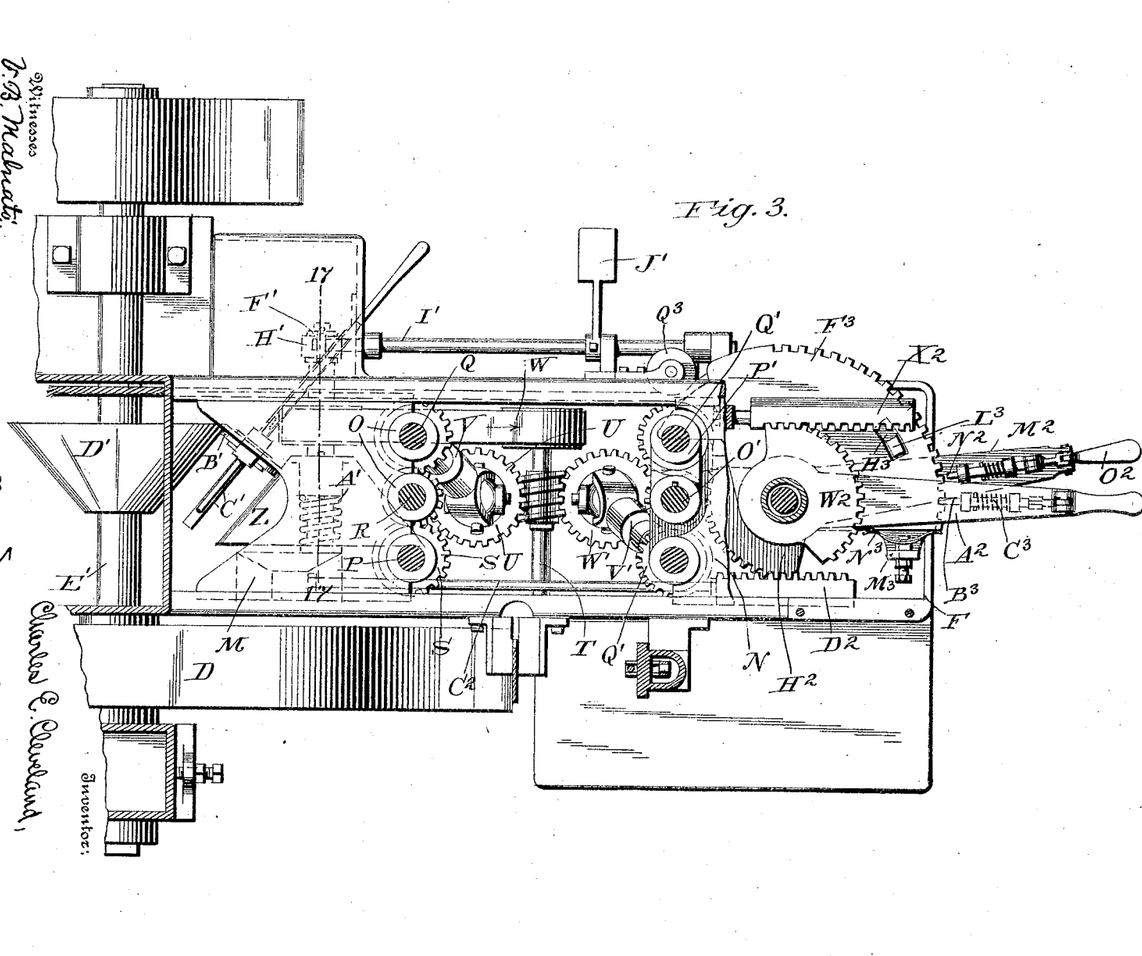
Fig. 3 a horizontal sectional view on the line 3—3 of Fig. 1.

Within the bracket and maintained in place by the guideways are slides K and L, while mounted in the guideways J are slides M and N. Slides K and M are each provided with a series of three bosses O, which form the bearings for the shafts of the rolls P and Q and the intermediate driving shaft R. The shafts are provided with intermeshing driving gears S and the shaft of roll P is driven from a worm-shaft T, through a worm-wheel U and an interposed extensible universal coupling V. Motion is imparted to the worm-shaft T by a belt W which passes over a pulley mounted upon said shaft, and about a pulley X secured upon a shaft Y, which latter is slidably mounted in suitable bearings formed in the bed of the machine; see Figs. 3 and 17.

Splined to the shaft is a driving cone Z, and surrounding the shaft in rear of the cone and abutting against the cone and one of the fixed bearings of the shaft is a spring A′, said spring acting to force the shaft outwardly and bring the cone into contact with a friction driving disk B′ mounted upon a rod C′, which rod may be shifted by the operator as desired, to change the position of the disk relatively to the driving cone Z and the companion driving cone D′, mounted upon the lower band-wheel shaft E′.

Secured to the outer reduced end of the shaft Y is a sleeve F′, provided with laterally-projecting pins G′ which pass through openings formed in the lower ends of a forked lever H′. Said lever is secured to one end of a rock-shaft I′ upon which is mounted a pedal J′. As will be seen upon reference to Fig. 17, when said pedal is depressed the spring A′ is compressed and the cone Z moved away and out of contact with the driving disk B′, so that the rotation of the worm-shaft T may be stopped at any time, and consequently the rotation of the feed rolls likewise arrested.

The slides L and N are each provided with a fixed boss K′ adapted to receive the axle or shaft L′ of the feed roll M′. Said slides L and N are also each provided with a second boss N′ through which is loosely passed a shaft O′ (see Fig. 4). Secured to the shaft, adjacent to the slides L and N, are links P′, shown in detail in Fig. 9, said links being provided at their outer or free ends with bosses or openings adapted to receive the shaft Q′ upon which is mounted the feed roll R′. A helical spring S′ encircles the upper end of the shaft O′, one end of the spring being secured to a collar T′ rigidly fixed to the upper end of the shaft, while the lower end of the spring is seated in a recess formed in the upper boss N′, or a fixed portion of the slide. This arrangement of the spring will tend to rotate shaft O′, and as a consequence to throw links P′ outward and hold the roll R′ slightly in advance of the roll M′.

The various shafts L′, O′ and Q′ are provided with suitable intermeshing gears U′, the gear upon shaft O′ being a loose one and motion is imparted to the shaft L′ by an extensible universal coupling V′ which is connected to the lower end of the shaft and a worm-wheel W′ which meshes with the worm carried by the shaft T. Thus it will be noted that all of the rolls are driven from a common source, which is under the direct control of the operator. It will furthermore be noted that by the use of the universal couplings the rolls may be adjusted toward and from each other without in any manner affecting the driving thereof.

Figure 4:
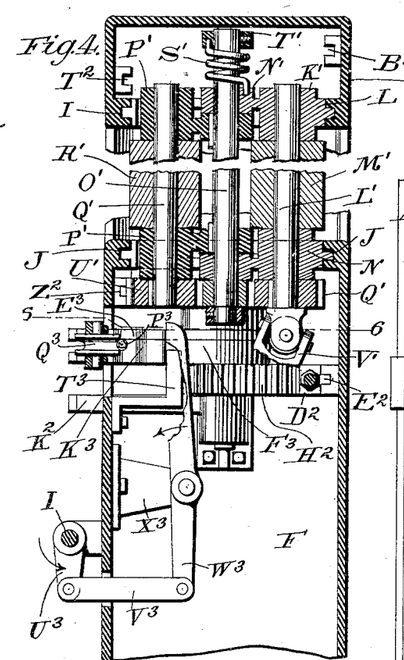
Fig. 4 a transverse vertical sectional view on the line 4—4 of Fig. 1.
Figure 5:
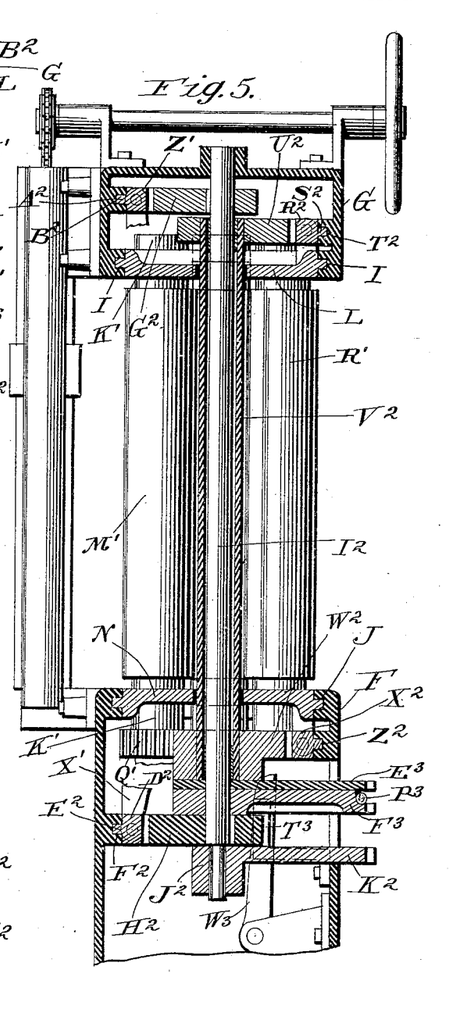
Fig. 5 a like view on the line 5—5 of Fig. 1.
Figures 7, 8, 9, 10, 11, 12:
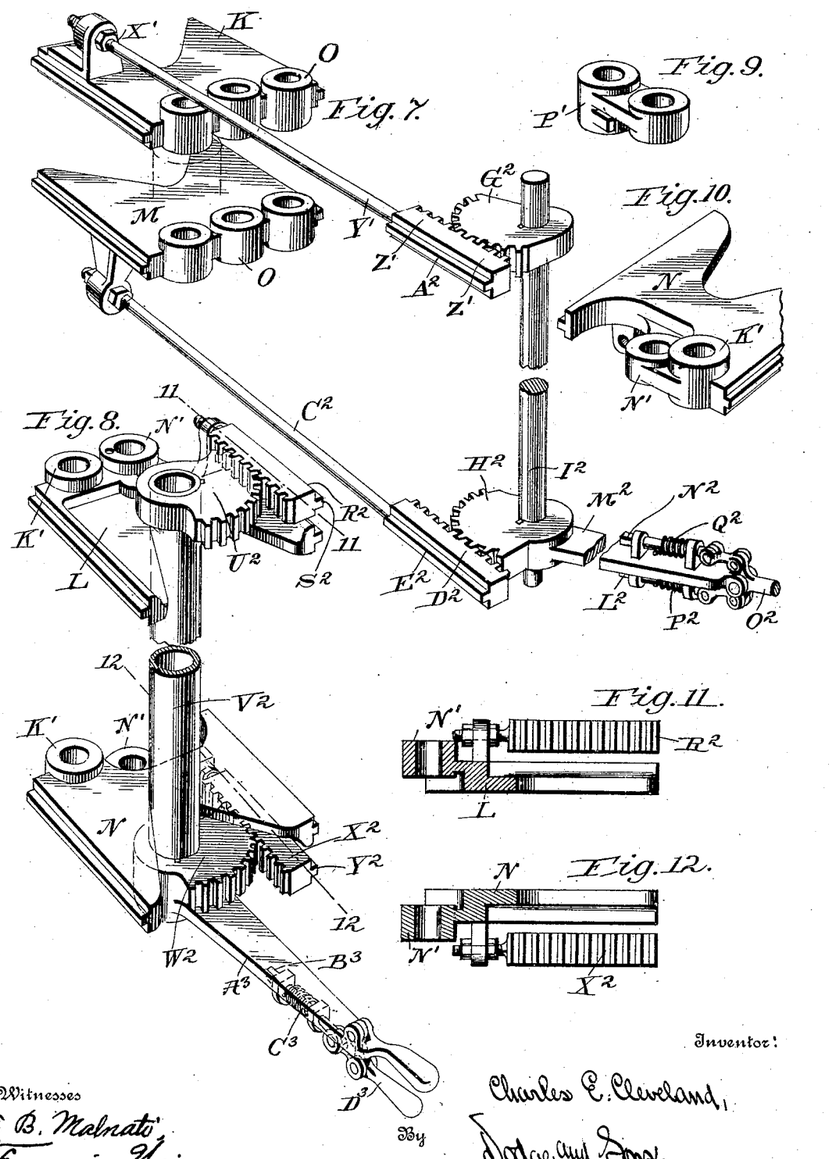
Fig. 7 a perspective view of the slides and journal-boxes or bearings for the inner feed rolls, and a portion of the positioning mechanism.
Fig. 8 a like view of the corresponding parts employed with the outer set of rolls.
Figs. 9 and 10 perspective views of the journal bearings for the outer rolls.
Figs. 11 and 12 sectional views on the lines 11—11 and 12—12, respectively, of Fig. 8.

The slides K and M, as shown in Fig. 7, are each provided with a lug or bracket X′, and to the lug of the upper member is adjustably secured a rod Y′ which at its outer or forward end is provided with a rack-bar Z′, said bar having a rib $A^2$ arranged to work in a guide way $B^2$, Figs. 4 and 5, formed in the bracket G. To the lug of the lower slide M is also adjustably secured a rod $C^2$ carrying at its outer end a rack $D^2$, likewise provided with a rib $E^2$ which fits and works in a guideway $F^2$ formed in the base or bed of the machine, see Fig. 5.

The rack Z′ meshes with a sector gear $G^2$, while the rack $D^2$ meshes with a sector gear $H^2$, said gears being splined upon a shaft $I^2$. The upper end of said shaft finds its bearing in a boss or projection formed in the bracket G, while the lower end of the shaft is mounted in a bracket $J^2$ secured to the outer portion of the bed of the machine, the bracket being shown in detail in Fig. 16 and in position in Fig. 1. Said bracket also carries a sector-shaped locking rack $K^2$, adapted to coact with a bolt $L^2$ mounted upon and movable with a lever $M^2$ which extends outwardly from the sector gear $H^2$. Said lever $M^2$ carries a second bolt $N^2$, said bolts being connected to a handle $O^2$, which handle is held normally in a horizontal position by springs $P^2$ and $Q^2$ which encircle the bolts $L^2$ and $N^2$, as best shown in Fig. 7.

As will be readily appreciated, the rotation of the shaft $I^2$ by the lever $M^2$ will cause the movement of the slides K and M along their ways, and as a consequence advance or recede the inner feed rolls to or from the saw.

To the slide L is adjustably secured a rack $R^2$ (see Figs. 8 and 11), said rack being provided with a rib $S^2$ which works in a slideway or channel $T^2$ formed in the bracket G. Said rack meshes with a sector gear $U^2$ secured upon the upper end of a tubular shaft $V^2$, the lower end of said shaft carrying a similar sector-gear $W^2$. A rack $X^2$, adjustably secured to the lower slide N, meshes with said sector-gear $W^2$ and is provided with a rib $Y^2$ which works in a guideway $Z^2$ formed in the bed F, see Fig. 5.

The sector-gear $W^2$ is provided with an outwardly-extending handle or lever $A^3$ by the movement of which the shaft V² may be rotated and as a consequence the slides L and N moved backward and forward in their guideways, carrying with them the outermost set of feed rolls and advancing the same toward or from the saw according to the direction of movement of the lever.

When the parts are assembled, the hollow shaft V² encircles the shaft I², as is clearly seen upon reference to Figs. 1 and 5.

The lever A³ is provided with a latch or bolt B³ which is normally pressed inwardly by a spring C³, a retracting handle D³ being provided for withdrawing the bolt when necessary.

Figure 6:
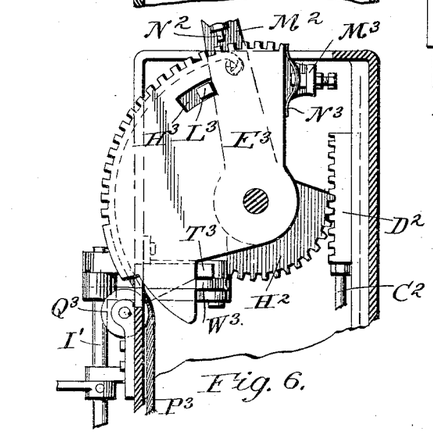
Fig. 6 a horizontal sectional view on the line 6—6 of Fig. 4, showing a portion of the positioning and actuating mechanism for the feed rolls.
Figures 13, 14, 15, 16, 17, 18, 19:
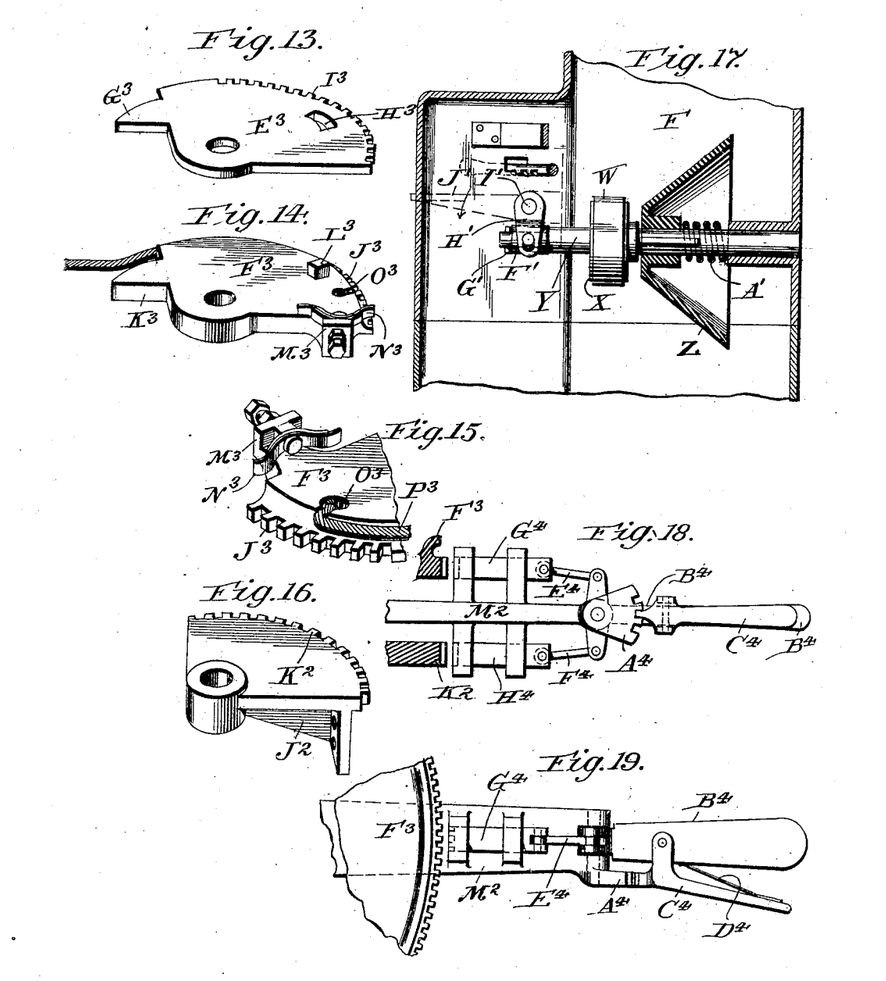
Fig. 13 a perspective view of one of the sector-shaped members employed primarily in conjunction with the mechanism shown in Fig. 8, to position the outer set of feed-rolls.
Figs. 14 and 15 perspective views of another of said sector-shaped members, which, acting in conjunction with the mechanism illustrated in Fig. 7, serves primarily to position the inner set of rolls, and at the same time, under the action of a weight, to cause one or both sets of rolls, as the case may be, to move up to the saw-line to a slight extent to compensate for varying thickness of the lumber.
Fig. 16 a perspective view of the fixed locking sector or sector-shaped rack.
Fig. 17 a sectional view taken on the line 17—17 of Fig. 3, illustrating the means employed for releasing the roll drive.
Figs. 18 and 19 detail views of a modified form of locking mechanism used in conjunction with one of the handles or levers.

Swiveled upon the shaft I², between the sector gears W² and H² are two sector-shaped members E³ and F³, shown in detail in Figs. 13, 14 and 15. The member E³ is provided with an outwardly-extending nose or projection G³ and with a slot or opening H³, the latter being arranged adjacent to the teeth I³ on the periphery of said member. The member F³ is likewise provided with a series of teeth J³, upon its periphery, and also with a nose or projection K³. Formed upon the member F³ is an upwardly-extending lug L³, which when the parts are assembled occupies a position within the slot or opening H³, see Fig. 6. Said member F³ has also a second lug or projection M³ at one side thereof, which forms the support for a curved bearing spring N³ against which the flat face or edge of the sector-shaped member E³ normally rests. A notch O³ is formed in the member F³ adjacent to its periphery, and the knotted end of a rope or cord P³ is secured therein, said rope passing around a guide pulley Q³ which normally holds the rope against the periphery of the sector-shaped member F³ as the same is rotated, the rope also passing over a pulley R³ (Fig. 2) and having a weight S³ secured to its free end.

Secured to the inner face of the bed or table (see Figs. 1, 4 and 6) is a fixed bracket or stop T³, the upper end of which stands in line with the nose or projection K³ of the member F³, and serves to arrest the rotation of said member F³ and the allied parts when the bolts B³, N² and L² are withdrawn or the piece of lumber has passed clear of the rolls and the latter are drawn together through the action of the weight S³ and the parts just described.

Mounted upon the rock-shaft I' is an arm U³, to which in turn is pivotally connected a link V³, said link being likewise pivotally connected to the lower end of a lever W³, fulcrumed upon a bracket X³ secured to the bed F. The upper end of said lever W³ stands to one side of the stop T³ and directly in alinement with the projections G³ and K³ of the sector-shaped members E³ and F³.

As will be noted, when the pedal J' is depressed, in the act of rocking shaft I' to move the driving cone Z out of contact with the friction driving disk B', the upper end of the lever W³ will be swung outward and come into contact with the projections, thus moving the sector-shaped members slightly, and opening the rolls to that extent.

Figure 2:
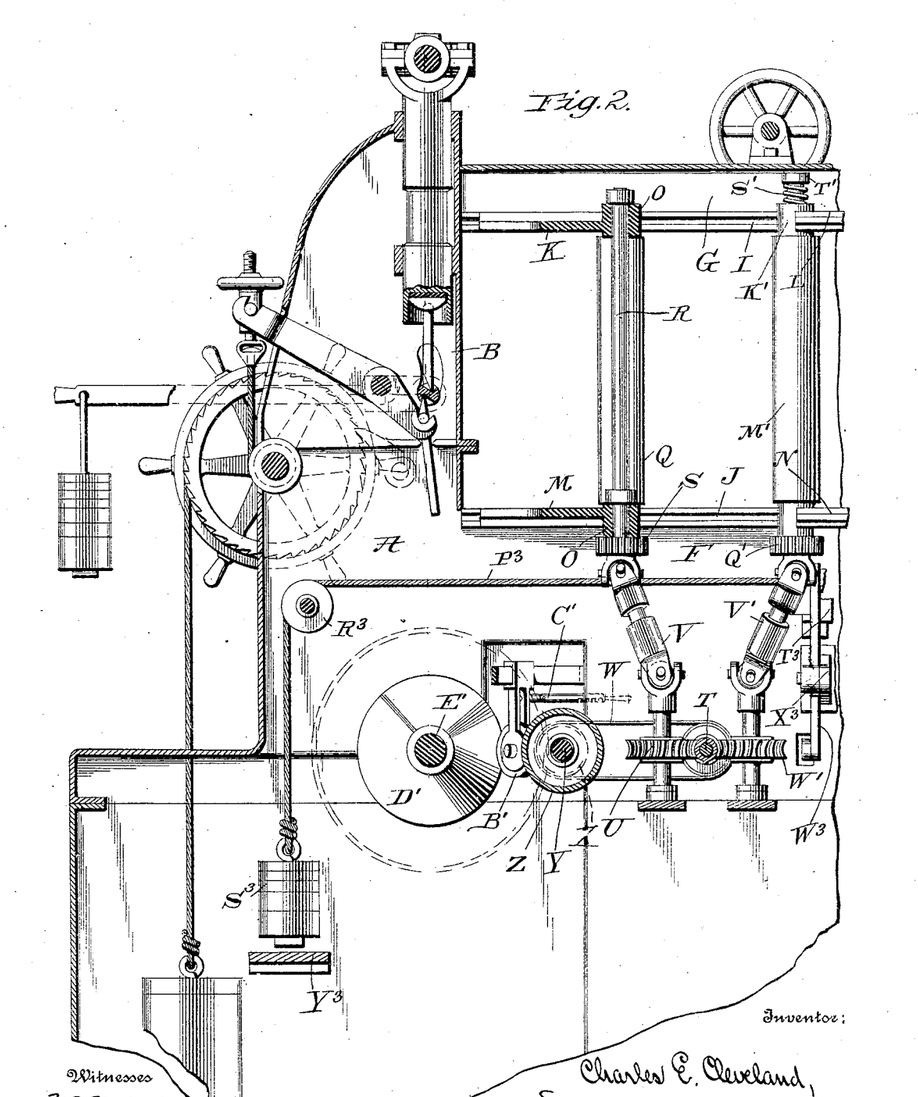
Fig. 2 a vertical sectional view of a portion of the machine.

It is evident that instead of employing the fixed stop T³, a shelf Y³ may be arranged beneath the weight S³, as shown in Fig. 2, to arrest the descent of the weight and consequently to stop further rotation of the parts.

If the latch or bolt B³, attached to the lever A³, is withdrawn from the sector-shaped member E³, the lever may be rotated independently of said member, imparting motion to the hollow shaft V² and consequently moving the outer rolls in or out through the connections heretofore described, to wit the sector gears U² and W², and racks R² and X², which are attached to the slides L and N.

In the adjustment of the machine it will, of course, be understood that the rolls are always set a little closer than the thickness of the stock being sawed, so that when the material is passed between the rolls it forces them apart thus raising the weight and consequently applying pressure upon the material being sawed. It is to be noted that when the handle O² stands in its horizontal position, neither of the bolts L² and N² is in engagement with the teeth of the rack K² or the teeth of the sector-shaped member F³.

Assuming now that it be desired to lock the inner rolls and to leave the outer rolls free, the lever handle M² is swung in one or the other direction until the slides M and K (which are simultaneously moved) are brought to such position that the rolls P and Q stand in proper relation or at a proper distance from the saw. The bolt L² is then caused to pass into one of the notches or between two of the teeth of the fixed sector-shaped rack K². The inner rolls will thus be locked in their adjusted positions. The handle A³ is then moved so as to bring the outer rolls to the desired positions with reference to the saw, and the bolt B³ is allowed to engage one of the teeth of the sector-shaped member E³. This in effect connects the slides in which the outer rolls are journaled to the weight S³, this by reason of the lug L³, formed upon the member F³, passing through the slot H³ in the member E³. The weight will, of course, tend to rotate the sector-shaped member F³, the member E³, and the sector gear W² (to which the handle A³ is attached) and consequently move the slides L and N in which the outer rolls are mounted, until the members G³ and K³ (carried respectively by the sector-shaped members E³ and F³) come into contact with the stop T³. Under this adjustment of the machine, the inner rolls, as just noted, are fixed and sufficient pressure will be exerted upon the lumber by the outer rolls, which will move outwardly to a slight extent away from the saw as the stock is entered between the rolls. As the lumber assumes this position the projections $G^3$ and $K^3$ are moved out of contact with the stop $T^3$, so that the weight will act to constantly draw the outer rolls against the material being acted upon by the saw. The outer rolls will, of course, move away from the saw to compensate for any inequalities in the lumber being sawed, the weight immediately moving the rolls back toward the saw when the enlarged part of the stock has passed the rolls.

When center-sawing is to be done, the machine is adjusted in the following manner: The lever $A^3$ is swung in one or the other direction to effect adjustment of the outer rolls, after which the bolt $B^3$ is permitted to pass into one or another of the notches in the sector-shaped member $E^3$. The lever $M^2$ is moved so as to effect adjustment of the inner rolls toward or from the saw as required. The handle $O^2$ is then raised, the bolt $N^2$ passing into one of the notches in the sector-shaped member $F^3$ thereby locking the sector-gear $H^2$ to the sector-shaped member $F^3$, so that said gear will rotate with said member and, through the connections before described, cause the simultaneous movement of the slides M and K. The inner rolls are thus connected to the sector-shaped member $F^3$ upon which the weight is acting, and the outer rolls are connected to the sector-shaped member $E^3$, and said sector-shaped members are in turn connected to each other through the lug $L^3$ and the slot $H^3$, this connection being a yielding one by reason of the elongation of the slot and the employment of the spring $N^3$.

The spring $N^3$ acts in center-sawing to secure two boards of equal thickness if the stock is even or in excess of the measurement for which the rolls are set, and to make one perfect board if the material being sawed is scant. For instance, if the rolls are set for center-sawing stock four inches thick the sector-shaped member $F^3$ being retained against the stop by means of the weight, if the stock being fed into the machine is more than four inches in thickness both sets of rolls will automatically center the stock to the line of cut, and two planks of equal thickness will result. If, however, the stock is somewhat less than four inches in thickness, the member $F^3$ will remain against the stop and hold the outer rolls exactly two inches from the saw-line, while the spring $N^3$ will draw the inner rolls toward the saw to compensate for the scantness in the stock, and one perfect blank will be produced, the spring not having sufficient force to move the outer rolls until the edge of the slot $H^3$ strikes against the lug $L^3$, when both rolls will open equally from the stock.

As will be noted upon reference to Figs. 7 and 8, the slides which carry the rolls may be adjusted independently of each other and the rolls thus kept in alinement or plumb with the saw.

The amount of pressure which is to be applied to the stock being sawed can be varied by adding to or subtracting from the weight $S^3$.

The construction herein set forth permits a wide range of movement of the rolls and also affords a ready means whereby the apparatus may be changed from a center-sawing machine to one in which one set of rolls remains stationary and the other flexible.

In Figs. 18 and 19 is illustrated a modified arrangement of bolts for holding the lever $M^2$ in place. The outer end of said lever is provided with a fixed rack $A^4$, and a T-shaped handle $B^4$, fulcrumed on lever $M^2$, carries a pivoted locking arm $C^4$, the inner end of which is normally thrown in toward the rack by a spring $D^4$.

Pivotally connected to the upwardly and downwardly extending members of the T-shaped handle $B^4$ are links $E^4$ and $F^4$, said links in turn being likewise connected to the outer ends of sliding bolts $G^4$ and $H^4$, which may be thrown, respectively, into the teeth of the sector-shaped member $F^3$ or the fixed rack $K^2$. When once positioned, with both bolts withdrawn, or either bolt thrown in, the handle may be locked and the parts held in such relation. Under this arrangement it is not necessary that the attendant should hold the handle.

What is claimed is:

1. In a band-saw resawing machine, the combination of a bed; a band-saw supported thereby; a supporting frame extending outwardly from the bed; feed rolls mounted upon each side of the saw; slides for said rolls mounted in the frame and supporting the rolls at both top and bottom; motion-producing means engaging both the upper and lower slides of each pair of rolls in substantially the plane of movement of the slides, for causing the slides to move in unison; and means for applying pressure to the rolls through such motion-producing means.

2. In a band-saw resawing machine, the combination of a bed; a band-saw carried thereby; a supporting frame extending outwardly from the bed to one side of the saw; a pair of slides mounted in the upper portion of said frame; a second pair of slides mounted in the lower portion of the frame; vertically-arranged feed-rolls having their bearings in the oppositely-disposed upper and lower slides; motion-producing means engaging both the upper and lower slides of each pair of rolls in substantially the plane of movement of the slides, said motion-producing means serving to cause the slides to move in unison; and means for applying power through said motion-producing means for moving the slides and the rolls toward and from the saw.

3. In a band-saw resawing machine, the combination of a bed; a band-saw; a supporting frame extending outwardly from the bed to one side of the saw; a pair of slides mounted in the upper portion of the frame; a second pair of slides mounted in the lower portion of the frame; vertically-disposed feed rolls having their bearings in the oppositely-arranged upper and lower slides; motion-producing means engaging both the upper and lower slides of each pair of rolls, in substantially the plane of movement of the slides, said motion-producing means serving to cause said slides to move in unison; means for moving said slides toward and from the saw-line; means for holding the slides in their adjusted positions; and means acting through said motion-producing means for urging the rolls against the lumber.

4. In a band-saw resawing machine, the combination of a bed; a supporting frame extending outwardly from the bed to one side of the saw; a pair of slides mounted in the upper portion of the frame; a pair of slides mounted in the lower portion of the frame; vertically-disposed guide-rolls carried by the oppositely-arranged slides; motion-producing means engaging both the upper and lower slides of each pair of rolls in substantially the plane of movement of the slides, said motion-producing means serving to cause the slides to move in unison; means for moving the slides toward and from the saw; means for holding them in their adjusted positions; and means acting through the motion-producing means aforesaid serving to hold the rolls with a yielding pressure against the lumber.

5. In a band-saw resawing machine, the combination of a bed; a saw; a frame extending outwardly from the bed; a pair of slides mounted in the upper portion of the frame; a pair of slides mounted in the lower portion of the frame; rolls carried by the oppositely-disposed upper and lower slides; motion producing means engaging both the upper and lower slides of each pair of rolls, in substantially the plane of movement of the slides, said motion-producing means serving to cause said slides to move in unison; means for adjusting said slides; means for fixedly holding one set of rolls in their adjusted positions; and means acting through said motion-producing means for urging the other set of rolls toward the fixed rolls.

6. In a band-saw resawing machine, the combination of a bed; a saw; a frame extending outwardly from the bed; a pair of slides mounted in the upper portion of the frame; a second pair of slides mounted in the lower portion of the frame; rolls carried by the oppositely-disposed upper and lower slides; motion-producing means engaging both the upper and lower slides of each pair of rolls, in substantially the plane of movement of the slides, said motion-producing means causing the slides to move in unison; means for securing an initial adjustment of the slides toward or from the saw; means acting through said motion-producing means for urging the slides and the rolls carried thereby toward the saw; means for connecting the means for securing the initial adjustment of the slides to the means for urging the rolls toward the saw; and a stop for arresting the inward movement of the rolls toward the saw.

7. In a band-saw resawing machine, the combination of a bed; a band-saw; a frame extending outwardly from the bed; a pair of slides mounted in the upper portion of the frame; a second pair of slides mounted in the lower portion of the frame; rolls carried by the oppositely-arranged upper and lower slides; motion-producing means engaging the upper and lower slides of each pair, in substantially the plane of movement of said slides, whereby the slides of one pair may be moved in unison independently of the movement of the other pair; means for securing the initial adjustment of the rolls; means for holding the rolls in said adjusted position; and means acting through said motion-producing means for urging the rolls toward the saw and against the lumber being passed between the rolls.

8. In a band-saw resawing machine, the combination of a frame; a saw; a bed extending outwardly from one side of the frame; ways formed in said bed; a pair of slides mounted in said way; a bracket secured to the upper portion of the frame and extending outwardly therefrom over the bed; a pair of slides mounted in ways formed in said bracket; a pair of rolls mounted in each of the oppositely-disposed upper and lower slides; a vertically-disposed shaft provided with sector gears; racks meshing with said gears; rods connected to said racks extending inwardly toward the frame and connected to the innermost pair of upper and lower slides; a second shaft; sector gears carried by the upper and lower portions of said shafts; racks meshing with said sector gears, said racks being connected to the outermost pair of upper and lower slides;

means for rotating said shafts to vary the position of the rolls with reference to the saw-lines; and means for holding said parts in their adjusted positions.

9. In a band-saw resawing machine, the combination of a frame; a saw; a bed extending outwardly from the frame to one side of the saw; a pair of slides mounted in ways formed in said bed; a bracket extending outwardly from the upper portion of the frame in line with the bed; a pair of slides mounted in ways formed in said bracket; a pair of rolls carried by the oppositely-disposed upper and lower slides; a vertically-disposed shaft; connections intermediate said shaft and the innermost pair of slides, whereby said slides may be adjusted on rotation of the shaft; a second vertically-disposed shaft; connections intermediate said second shaft and the outermost pair of slides, whereby said slides may be moved toward and from the saw-line; and a yielding power device acting constantly to draw the rolls together.

10. In a band-saw resawing machine, the combination of a bed; a saw; a pair of rolls arranged to one side of the saw-line; a second pair of rolls arranged at the opposite side of the saw-line; means for urging the rolls toward each other and toward the saw-line; means for driving said rolls; and means for simultaneously throwing out the driving means and separating the rolls.

11. In a band-saw resawing machine, the combination of a saw; a set of rolls arranged adjacent to one side of the saw-line; a second set of rolls arranged on the opposite side of the saw-line; means for driving said rolls; means for drawing the rolls toward and from the saw-line and securing them in their adjusted positions; means for holding the rolls up to the work with a yielding pressure; and means for simultaneously arresting the movement of the rolls and separating the same.

12. In a band-saw resawing machine, the combination of a saw; a set of rolls arranged to one side of the saw-line; a second set of rolls arranged upon the opposite side of the saw-line; means for moving the inner set of rolls toward and from the saw; means for moving the outer set of rolls toward and from the saw; a lever for operating said first-named means; a second lever for operating the second-named means; a sector-shaped member pivotally supported adjacent to the first-named lever, said member being provided with teeth upon its periphery and with a slot or opening formed in the body thereof; a second sector-shaped member swiveled at a point below the first-named member, said second sector-shaped member being provided with a lug extending upwardly and into the slot formed in the other sector-shaped member, and also having teeth upon its periphery; a spring carried by the second member and bearing against the edge of the upper member; a bolt carried by the second lever and engaging the teeth of the first sector-shaped member; a fixed rack; a pair of bolts carried by the first lever and engaging respectively, under varying adjustments, the teeth formed upon the periphery of the second sector-shaped member and those of the fixed rack; a weight exerting a constant force upon the second sector-shaped member and acting at all times to rotate the same; and a stop for limiting the rotation of said second sector-shaped member.

13. In a band-saw resawing machine, the combination of a bed; a band saw; a frame extending outwardly from the bed to one side of the saw; a pair of slides mounted in the upper portion of the frame; a second pair of slides mounted in the lower portion of the frame; a pair of draw-rods extending outwardly from the innermost pair of upper and lower slides; a rack-bar secured to each of said rods; a rack-bar connected to each of the outermost slides; means for securing the adjustment of the rack-bars with reference to the slides; rolls mounted in the oppositely-disposed upper and lower slides; connected gears meshing with the rack-bars connected to the innermost pair of slides; connected gears meshing with the rack-bars connected to the outermost slides; means serving to urge the slides and the rolls carried thereby toward the saw; and means for connecting the gears to said urging means.

14. In a band-saw resawing machine, the combination of a bed; a band-saw; a supporting frame extending outwardly from the bed to one side of the saw; a pair of slides mounted respectively in the upper and lower portions of the frame, to one side of the saw; rolls carried thereby; a second pair of slides mounted in the upper and lower portions of the frame upon the opposite side of the saw; rolls mounted in said slides; a draw-rod extending from each of the innermost slides; a rack secured to the outer end of each of said rods; a shaft journaled in the frame; a pair of sector gears carried by said shaft and meshing with the racks aforesaid; racks adjustably connected to the second pair of slides; a hollow shaft encircling the first-named shaft; sector gears carried by said hollow shaft and meshing with the racks attached to the second pair of slides; a sector-shaped member journaled concentrically with the shafts; a weight secured to said sector-shaped member and serving to rotate the same; a second sector-shaped member also journaled concentrically with the shafts; a yielding connection between said sector-shaped members; means for connecting the first sector-shaped member to the first-named shaft after the shaft has been rotated and the inner rolls brought to their adjusted positions; and means for connecting the second sector-shaped member to the hollow shaft after said shaft has been rotated to bring the outer rolls to their desired adjusted positions.

15. In a band-saw resawing machine, the combination of a bed; a band-saw; a frame extending outwardly from the bed; a pair of oppositely-disposed slides mounted in the upper and lower portions of the frame to one side of the saw; rolls carried by said slides; draw-rods adjustably connected to said slides; a second pair of slides mounted in the upper and lower portions of the frame upon the opposite side of the saw; a pair of racks secured to the draw-rods; a second pair of racks secured to the outermost pair of slides; gears meshing with the first-named pair of racks and causing the same to move in unison; gears meshing with the second pair of racks and likewise causing them to move in unison; a sector-shaped member; a weight connected thereto; a lug extending upwardly from said sector-shaped member; a second sector-shaped member provided with an elongated opening through which the lug passes; a spring secured to the first sector-shaped member and bearing upon one side of the other sector-shaped member; means for connecting said sector-shaped members to the gearing which actuates the slides; and a stop serving to arrest the movement of one of said sector-shaped members when the roll operating therewith is moved inwardly toward the saw to a predetermined extent, whereby the rolls controlled by the movement of the other sector-shaped member may move inwardly toward the saw independently of the other rolls, substantially as and for the purpose specified.

16. In a band-saw resawing machine, the combination of a bed; a supporting frame extending outwardly from the bed; a pair of slides mounted in the upper portion of the frame; a second pair of slides mounted in the lower portion of the frame; vertically-disposed feed-rolls having their bearings in the oppositely-disposed upper and lower slides; a rod connected to each of said slides, each of the rods lying in approximately the same plane as its slide; and means for applying power to the slides through said rods, said means working in substantially the plane of movement of said slides.

17. In a band-saw resawing machine, the combination of a bed; a supporting frame extending outwardly therefrom; a pair of slides mounted in the upper portion of the frame; a second pair of slides mounted in the lower portion of the frame; vertically-disposed feed-rolls having their bearings in the oppositely - disposed upper and lower slides; a rod connected to each of said slides, each of said rods lying in approximately the same plane as its slide; means connecting the rods of each pair of oppositely-disposed upper and lower slides; and means for applying pressure to the rolls through such connecting means.

18. In a band-saw resawing machine, the combination of a bed; a supporting frame extending outwardly therefrom; a pair of slides mounted in the upper portion of the frame; a second pair of slides mounted in the lower portion of the frame; vertically-disposed feed-rolls having their bearings in the oppositely - disposed upper and lower slides; a rod connected to each of said slides, each of said rods lying in approximately the same plane as its slide; means connecting the rods of each pair of oppositely-disposed upper and lower slides; means for adjusting the slides toward and from the saw-line; and means for applying pressure to the rolls through said connecting means.

19. In a band-saw resawing machine, the combination of a bed; a band-saw supported thereby; a supporting frame extending outwardly from the bed; a pair of slides mounted in the upper portion of the frame; a second pair of slides mounted in the lower portion of the frame; vertically-disposed feed-rolls having their bearings in the oppositely-disposed upper and lower slides; motion-producing means engaging both the upper and lower slides of each pair of rolls, in substantially the plane of movement of the slides; means for securing adjustment of said motion-producing means whereby the rolls may be alined; and means for applying pressure to the rolls through such motion-producing means.

20. In a band-saw resawing machine, the combination of a bed; a supporting frame extending outwardly therefrom; a pair of slides mounted in the upper portion of the frame; a second pair of slides mounted in the lower portion of the frame; a pair of vertically-disposed rolls arranged at one side of the saw and having their bearings in oppositely-disposed upper and lower slides; a second pair of vertically - disposed rolls mounted upon the opposite side of the saw and having their bearings in oppositely-disposed upper and lower slides; shafts located at one end of the frame; connections extending from said shafts to the slides for moving them toward and from the saw said connections lying in the planes of said slides; and means acting to rotate the shafts and, through the connections aforesaid, to move the upper and lower slides equally toward and from the saw and to thereby position the rolls with reference to the saw.

21. In a band-saw resawing machine, the combination of a bed; a supporting frame extending outwardly therefrom; a pair of slides mounted in the upper portion of the frame; a second pair of slides mounted in the lower portion of the frame; vertically-disposed feed rolls having their bearings in the oppositely-disposed upper and lower slides, the rolls being arranged upon opposite sides of the saw-line; a power applying mechanism located adjacent to one end of the frame; and connections between said power applying mechanism and the slides for applying pressure to the rolls.

In testimony whereof I have signed my name to this specification in the presence of two subscribing witnesses.

CHARLES E. CLEVELAND.

Witnesses:
FRANK J. WOLFF,
ARNOLD PETRE.